United States Patent
Okumura et al.

(10) Patent No.: US 9,680,176 B2
(45) Date of Patent: Jun. 13, 2017

(54) ENERGY STORAGE BATTERY

(75) Inventors: Yasuyuki Okumura, Kyoto (JP);
Hiroshige Deguchi, Kyoto (JP); Lan Huang, Kyoto (JP); Shosuke Yamanouchi, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 1 day.

(21) Appl. No.: 14/416,060

(22) PCT Filed: Aug. 22, 2012

(86) PCT No.: PCT/JP2012/071223
§ 371 (c)(1),
(2), (4) Date: Jan. 20, 2015

(87) PCT Pub. No.: WO2014/030230
PCT Pub. Date: Feb. 27, 2014

(65) Prior Publication Data
US 2015/0194690 A1    Jul. 9, 2015

(51) Int. Cl.
*H01M 8/1032* (2016.01)
*H01M 8/20* (2006.01)
(Continued)

(52) U.S. Cl.
CPC ......... *H01M 8/1032* (2013.01); *C08J 5/2243* (2013.01); *C08J 7/16* (2013.01);
(Continued)

(58) Field of Classification Search
CPC .... H01M 8/1032; H01M 8/1023; H01M 8/20; H01M 8/188; H01M 8/1072;
(Continued)

(56) References Cited

U.S. PATENT DOCUMENTS

2005/0112471 A1* 5/2005 Chen .................... H01M 2/145
429/253
2006/0024555 A1    2/2006 Kohno et al.
(Continued)

FOREIGN PATENT DOCUMENTS

CN    101180760    5/2008
JP    53-084134    7/1978
(Continued)

OTHER PUBLICATIONS

Maiti et al., Where do poly(vinyl alcohol) based membranes stand in relation to Nafion® for direct methanol fuel cell applications?, Journal of Power Sources, 216 (2012) 48-66, Available online Jun. 13, 2012.*

(Continued)

*Primary Examiner* — Patrick Ryan
*Assistant Examiner* — Kiran Akhtar
(74) *Attorney, Agent, or Firm* — Jianq Chyun IP Office

(57) ABSTRACT

A positive electrode electrolyte (22) and a negative electrode electrolyte (32) that are used in this energy storage battery have a pH within the range from 2 to 8 (inclusive). An ion exchange membrane, which is obtained by graft-polymerizing styrenesulfonate to a resin film base material that uses an ethylene-vinyl alcohol copolymer as a matrix, is used as a diaphragm (12) of this energy storage battery.

4 Claims, 2 Drawing Sheets

(51) Int. Cl.
  *H01M 8/18* (2006.01)
  *H01M 8/1072* (2016.01)
  *H01M 8/1023* (2016.01)
  *C08J 5/22* (2006.01)
  *C08J 7/16* (2006.01)
  *H01M 8/1018* (2016.01)

(52) U.S. Cl.
  CPC ....... *H01M 8/1023* (2013.01); *H01M 8/1072* (2013.01); *H01M 8/188* (2013.01); *H01M 8/20* (2013.01); *C08J 2323/08* (2013.01); *H01M 2008/1095* (2013.01); *H01M 2300/0082* (2013.01); *Y02E 60/528* (2013.01); *Y02P 70/56* (2015.11)

(58) Field of Classification Search
  CPC ........ H01M 8/1069; C08J 7/16; C08J 5/2243; C08J 2323/08
  See application file for complete search history.

(56) References Cited

U.S. PATENT DOCUMENTS

| | | | | |
|---|---|---|---|---|
| 2006/0159972 | A1* | 7/2006 | Nodono | H01B 1/122 429/493 |
| 2006/0269815 | A1* | 11/2006 | Goldbach | B01D 67/0093 525/199 |
| 2008/0160374 | A1* | 7/2008 | Takagi | B01D 53/228 429/492 |

FOREIGN PATENT DOCUMENTS

| | | |
|---|---|---|
| JP | 54-140136 | 10/1979 |
| JP | 62-226580 | 10/1987 |
| JP | 10-074536 | 3/1998 |
| JP | 10-172600 | 6/1998 |
| JP | 2001-167788 | 6/2001 |
| JP | 2008-027627 | 2/2008 |
| JP | 2010-244972 | 10/2010 |

OTHER PUBLICATIONS

Kim et al., Preparation of ion exchange membranes for fuel cell based on crosslinked poly(vinyl alcohol) with poly(styrene sulfonic acid-co-maleic acid, Journal of Membrane Science, 281 (2006) 156-162.*

Maiti et al., Where do poly(vinyl alcohol) based membranes stand in relation to Nation® for direct methanol fuel cell applications?, Journal of Power Sources, 216 (2012) 48-66, Available online Jun. 13, 2012.*

"International Search Report (Form PCT/ISA/210)", mailed on Sep. 25, 2012, with English translation thereof, pp. 1-4.

Koyama et al., "An interpolymer anionic composite reverse osmosis membrane derived from poly(vinyl alcohol) and poly(styrene sulfonic acid)," Journal of Applied Polymer Science, Jan. 28, 1982, pp. 2783-2789.

"Office Action of China Counterpart Application" with English translation, issued on Mar. 2, 2016, p. 1-p. 13.

"2nd Office Action of China Counterpart Application", with English translation thereof, issued on Sep. 12, 2016, p. 1-p. 11.

* cited by examiner

ENERGY STORAGE BATTERY

CROSS-REFERENCE TO RELATED APPLICATION

This application is a 371 application of the International PCT application serial no. PCT/JP2012/071223, filed on Aug. 22, 2012. The entirety of the above-mentioned patent application is hereby incorporated by reference herein and made a part of this specification.

BACKGROUND OF THE INVENTION

Field of the Invention

The invention relates to an energy storage battery, such as a redox flow battery.

Description of the Related Art

Among energy storage batteries, such as redox flow batteries and the like, for example, those having an ion exchange membrane, the base material of which is a resin film, as a diaphragm have been known so far (Patent Document 1, for example). Also, among diaphragms for energy storage batteries, those obtained by applying a polymer having ion exchange groups on the base material, such as a woven fabric, have been known (Patent Documents 2 and 3).

A constitution which graft-polymerizes polystyrene sulfonate to a resin film has been known as a typical diaphragm for batteries (Patent Document 4).

PRIOR ART DOCUMENTS

Patent Documents

Patent Document 1: Japanese Patent Publication No. 2010-244972
Patent Document 2: Japanese Patent Publication No. 2008-027627
Patent Document 3: Japanese Patent Publication No. 2001-167788
Patent Document 4: Japanese Patent Publication No. S53-84134

SUMMARY OF THE INVENTION

Problems to be Solved by this Invention

Typical aqueous batteries use strong acidic or strong alkaline electrolytes. In such cases, the ion conductive carriers are $H^+$ ions or IT ions. Since the mobility of $H^+$ ion and the mobility of $H^-$ ion are relatively high, the conductivity of the electrolyte increases. Therefore, the efficiency of the battery increases as a result of decline in the resistance of the battery. When such electrolytes with strong acidity or strong alkalinity are used, the material that constitutes the battery requires chemical-resistance that can withstand the electrolytes. In this regard, it is preferable to use fluororesin, which has superior chemical-resistance, as a base material comprising a diaphragm for the positive electrode electrolyte and the negative electrode electrolyte. However, an expensive diaphragm having superior chemical-resistance increases the production cost of the energy storage battery.

On the contrary, when an electrolyte with a pH of 2 to 8 is used, the production cost of the energy storage battery can be reduced because the chemical-resistance of the material comprising the battery can be lowered. However, in such cases, the ion conductive carriers are, for example, $Na^+$ ions, $K^+$ ions, $Cl^-$ ions, $SO_4^{2-}$ ions, etc. and are neither $H^+$ ions nor $H^-$ ions. Since the mobility of such ions is lower than the mobility of $H^+$ ion and $H^-$ ion, the conductivity of the electrolyte turns out to be lower. Therefore, as a result of increase in the resistance of the battery, the efficiency of the battery decreases.

The present invention was made in view of these situations, and its purpose is to provide an energy storage battery having a diaphragm suitable for enhancing the efficiency of the battery while reducing the production cost of the energy storage battery when electrolytes with a pH of 2 to 8 are used.

Means for Solving the Problems

To achieve the above purpose, in an embodiment of the present invention, an energy storage battery using a positive electrode electrolyte and a negative electrode electrolyte with a pH within the range of 2 to 8 is provided, and the energy storage battery has an ion exchange membrane, formed by graft-polymerizing styrenesulfonate to a resin film base material a matrix of which is ethylene-vinyl alcohol copolymer, as the diaphragm for the positive electrode electrolyte and the negative electrode electrolyte.

In the above energy storage battery, the thickness of the ion exchange membrane is preferably greater than or equal to 50 μm and less than or equal to 100 μm.

In the above energy storage battery, the graft rate of the ion exchange membrane is preferably greater than 10% and less than 120%.

DESCRIPTION OF THE EMBODIMENTS

A redox flow battery as the energy storage battery of an embodiment of the present invention is described below.

<Structure of the Redox Flow Battery>

Figure 1:
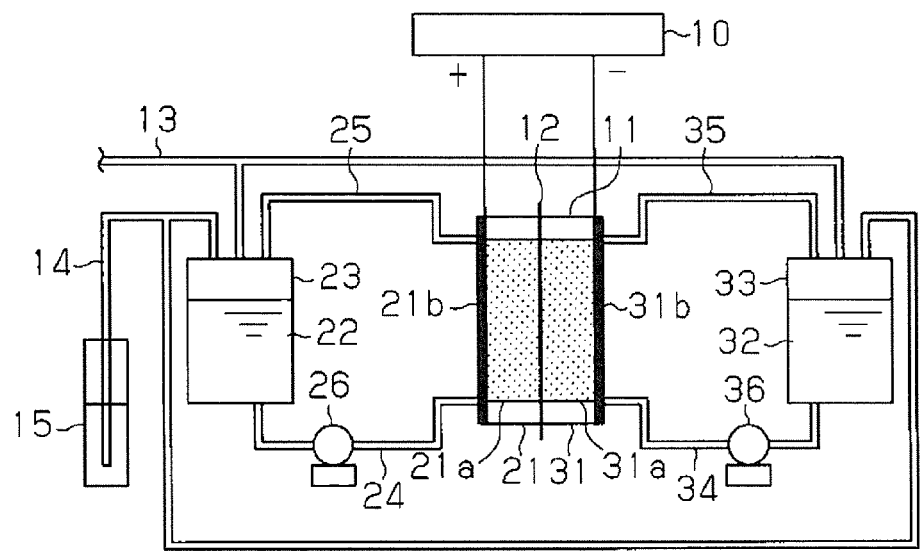
FIG. 1 is a schematic view illustrating an embodiment of a redox flow battery of the present invention.

As shown in FIG. 1, the redox flow battery includes a charge/discharge cell 11. The inside of the charge/discharge cell 11 is divided into a positive electrode side cell 21 and a negative electrode side cell 31 by a diaphragm 12. The redox flow battery also includes a positive electrode electrolyte tank 23 storing a positive electrode electrolyte 22 used for the positive electrode side cell 21 and a negative electrode electrolyte tank 33 storing a negative electrode electrolyte 32 used for the negative electrode side cell 31. A temperature control apparatus to control the temperature around the charge/discharge cell 11 may be disposed as needed.

In the positive electrode side cell 21, a positive electrode 21a and a positive electrode side collector plate 21b are disposed in a contact state. In the negative electrode side cell 31, a negative electrode 31a and a negative electrode side collector plate 31b are disposed in a contact state. The positive electrode 21a and the negative electrode 31a are made of carbon-made felts, for example. The positive electrode side collector plate 21b and the negative electrode side collector plate 31b are made of glassy carbon plates, for example. Each of the positive electrode side collector plate 21b and the negative electrode side collector plate 31b is electrically connected to a charge/discharge apparatus 10.

The positive electrode electrolyte tank 23 is connected to the positive electrode side cell 21 via a supply tube 24 and a collection tube 25. The supply tube 24 is equipped with a pump 26. By the operation of the pump 26, the positive electrode electrolyte 22 inside the positive electrode electrolyte tank 23 is supplied to the positive electrode side cell 21 through the supply tube 24. Meanwhile, the positive electrode electrolyte 22 inside the positive electrode side cell 21 is collected through the collection tube 25. As such, the positive electrode electrolyte 22 circulates between the positive electrode electrolyte tank 23 and the positive electrode side cell 21.

The negative electrode electrolyte tank 33 is connected to the negative electrode side cell 31 via a supply tube 34 and a collection tube 35. The supply tube 34 is equipped with a pump 36. By the operation of the pump 36, the negative electrode electrolyte 32 inside the negative electrode electrolyte tank 33 is supplied to the negative electrode side cell 31 through the supply tube 34. Meanwhile, the negative electrode electrolyte 32 inside the negative electrode side cell 31 is collected through the collection tube 35. As such, the negative electrode electrolyte 32 circulates between the negative electrode electrolyte tank 33 and the negative electrode side cell 31.

An inert gas supply tube 13 which supplies inert gas is connected to the charge/discharge cell 11, the positive electrode electrolyte tank 23, and the negative electrode electrolyte tank 33. The inert gas is supplied to the inert gas supply tube 13 by an inert gas generator. By supplying the inert gas to the positive electrode electrolyte tank 23 and the negative electrode electrolyte tank 33 through the inert gas supply tube 13, the positive electrode electrolyte 22 and the negative electrode electrolyte 32 are prevented from contacting oxygen in the atmosphere. Nitrogen gas is used as the inert gas, for example. The inert gas supplied to the positive electrode electrolyte tank 23 and the negative electrode electrolyte tank 33 is exhausted through an exhaust tube 14. A water-sealing part 15 is configured at the exhaust-side end of the exhaust tube 14. The water-sealing part 15 prevents the air from flowing backward to the exhaust tube 14, as well as maintains the pressure inside the positive electrode electrolyte tank 23 and the negative electrode electrolyte tank 33 at a constant level.

During charging, an oxidation reaction occurs in the positive electrode electrolyte 22 contacting the positive electrode 21a, while a reduction reaction occurs in the negative electrode electrolyte 32 contacting the negative electrode 31a. That is, the positive electrode 21a emits electrons, while the negative electrode 31a receives electrons. At the same time, the positive electrode side collector plate 21b supplies the electrons emitted by the positive electrode 21a to the charge/discharge apparatus 10. The negative electrode side collector plate 31b supplies the electrons received from the charge/discharge apparatus 10 to the negative electrode 31a.

During discharging, a reduction reaction occurs in the positive electrode electrolyte 22 contacting the positive electrode 21a, while an oxidation reaction occurs in the negative electrode electrolyte 32 contacting the negative electrode 31a. That is, the positive electrode 21a receives electrons, while the negative electrode 31a emits electrons. At the same time, the positive electrode side collector plate 21b supplies the electrons received from the charge/discharge apparatus 10 to the positive electrode 21a. The negative electrode side collector plate 31b supplies the electrons emitted by the negative electrode 31a to the charge/discharge apparatus 10.

<Electrolyte>

The pH of the positive electrode electrolyte 22 and the pH of the negative electrode electrolyte 23 are within the range of 2 to 8. The pH of the positive electrode electrolyte 22 and the pH of the negative electrode electrolyte 23 are preferably within the range of 4 to 7. That is, an aqueous solution including an active material that is able to perform an oxidation reaction within the above pH range is used as the positive electrode electrolyte 22 and the negative electrode electrolyte 32. With the pH of the positive electrode electrolyte 22 and the pH of the negative electrode electrolyte 23 being equal to or greater than 2, corrosion resistance is easily maintained. With the pH of the positive electrode electrolyte 22 and the pH of the negative electrode electrolyte 23 being less than or equal to 8, solubility of the active material, for example, is easily maintained.

Examples of the active material include an iron-based redox material, a chrome-based redox material, a manganese-based redox material, a copper-based redox material, and a vanadium-based redox material.

It is preferable that the active material is included in the electrolyte as a metal complex to inhibit deposition within the above-mentioned pH range. A chelating agent for forming the metal complex is able to form a complex with the active material, and is selected from an aminocarboxylic-based chelating agent and a polyethyleneimine, for example.

Examples of the aminopolycarboxylic acid-based chelating agent include ethylene diamine tetraacetic acid (EDTA), ethylene glycol tetraacetic acid (EGTA), diethylene triamine pentaacetic acid (DTPA), N-(2-Hydroxyethyl)ethylenediamine-N,N',N'-triacetic acid (EDTA-OH), and nitrile triacetic acid (NTA). The aminopolycarboxylic acid-based chelating agent may be alkali metal salt such as sodium salt and potassium salt. The polyethyleneimine is, for example, one with a weight-average molecular weight of 200 to 100,000.

A single or multiple types of active materials may be used, and a single or multiple types of chelating agents may be used as well. The positive electrode electrolyte 22 and the negative electrode electrolyte 32 may have different compositions or have the same composition. In view of maintaining the stability of the redox flow battery's performance for a long period of time, it is preferable to use one-liquid type electrolyte using electrolytes having the same composition for both the positive electrode electrolyte 22 and the negative electrode electrolyte 32. The one-liquid type electrolyte contains a Cr-EDTA complex and a Mn-EDTA complex, for example. EDTA is sometimes indicated as "EDTA4H". In view of further enhancing the energy efficiency, the concentration of the active material or the metal complex in the electrolyte is preferably greater than or equal to 0.1 mol/L, and more preferably greater than or equal to 0.2 mil/L, and more preferably greater than or equal to 0.4 mol/L. In light of inhibiting deposition of the active material, the concentration of the active material or the metal complex in the electrolyte is preferably less than or equal to 2.5 mol/L, and more preferably less than or equal to 1.5 mol/L.

An inorganic acid salt or an organic acid may be included in the electrolyte as needed. The electrolyte may be prepared by a publicly known method. Water used for the electrolyte preferably has purity the same as or greater than the purity of distilled water. It is preferable for the redox flow battery that the electrolyte is charged or discharged in an inert gas atmosphere.

<Structure of Diaphragm 12>

The diaphragm 12 prevents the active material from passing between the positive electrode side cell 21 and the negative electrode side cell 31. The diaphragm 21 is made of an ion exchange membrane. During the charging, the diaphragm 21 allows, for example, sodium ions inside the positive electrode side cell 21 to pass through to the negative electrode side cell 31, and during the discharging, the diaphragm 21 allows, for example, sodium ions inside the negative electrode side cell 31 to pass through to the positive electrode side cell 21. The ion exchange membrane is obtained by graft-polymerizing styrenesulfonate to a resin film, the matrix of which is ethylene-vinyl alcohol copolymer. In this ion exchange membrane, the styrenesulfonate structure of the graft chain contributes to the exchange of positive ions.

A nonporous resin film with the thickness of 20 μm to 150 μm, for example, is used as a resin film base material. In view of enhancing energy efficiency, the thickness of the resin film base material is preferably within the range of 50 μm to 100 μm. In view of easily maintaining the strength of the diaphragm 12, the ethylene content of ethylene-vinyl alcohol copolymer is preferably, for example, greater than or equal to 20 mol %. In view of hydrophilicity, the ethylene content of ethylene-vinyl alcohol copolymer is preferably less than or equal to 50 mol %.

The resin film base material may be blended with a resin other than ethylene-vinyl alcohol copolymer. The resin film base material may include additives such as a plasticizer. It is preferable that the resin film base material contains 90 mass % of ethylene-vinyl alcohol copolymer.

Styrenesulfonate is graft-polymerized to ethylene-vinyl alcohol copolymer so as to introduce polystyrene sulfonate as a graft chain. It is preferable to use alkali metal salt, and more preferable to use sodium salt or potassium salt, as styrenesulfonate.

In view of enhancing energy efficiency, the graft rate of the ion exchange membrane is preferably greater than 10% and less than 120%.

The graft rate is calculated by assigning the mass of the resin film base material before graft-polymerization as $W_0$ and the mass of the ion exchange membrane as $W_1$ to the formula (1) below.

$$\text{Graft rate}(\%) = 100 \times (W_1 - W_0)/W_0 \quad (1)$$

<Production of Diaphragm 12 (Ion Exchange Membrane)>

The diaphragm 12 is produced through a polymerization process.

The polymerization process introduces a graft chain to a radical active site formed on the resin film base material by using polystyrene sulfonate. The radical active site may be formed by a radical polymerization initiator, irradiation of ionizing radiation, irradiation of ultraviolet, irradiation of ultrasonic, irradiation of plasma, etc. Among those forming methods of the radical active site, the polymerization process using irradiation of ionizing radiation has advantages of simple production process, safety, and minor environmental load.

Examples of ionizing radiation are, for example, α rays, β rays, γ rays, electron beam, and X rays. Among the above, in view of easy access in the industry, γ rays radiated from cobalt 60, electron beam emitted by an electron beam accelerator, and X rays, for example, are preferable.

In view of preventing the reaction between oxygen and the radical active site, it is preferable to carry out irradiation of ionizing radiation in an inert gas atmosphere such as nitrogen gas, neon gas, and argon gas. Absorbed dose of ionizing radiation is in the range of 1 to 300 kGy, for example. The graft rate may be changed by adjusting the absorbed dose of ionizing radiation.

During the polymerization process, a solution containing styrenesulfonate is brought into contact with the resin film base material to which the radical active site has been formed. It is possible to accelerate the radical polymerization reaction by shaking or heating the resin film base material soaked into the solution containing styrenesulfonate.

Examples of a solvent of the solution containing styrenesulfonate include water, alcohol such as methanol and ethanol, a hydrophilic solvent, an example of which is hydrophilic ketone such as acetone, and a mixed solvent in which multiple types of hydrophilic solvents are mixed. In view of reducing the cost of the production process, reducing environmental load, and improving safety of the process, it is preferable to include water as a main component of the solvent that is to be used, and it is more preferable to use water as the solvent. Ion exchange water, pure water, and ultrapure water, for example, are used as the water.

The graft rate may be changed by adjusting the concentration of styrenesulfonate in the solution. The concentration of styrenesulfonate in the solution is, for example, in the range of 5 to 35 mass %, and preferably in the range of 10 to 30 mass %. When the concentration of styrenesulfonate is greater than or equal to 5 mass %, it is easier to increase the graft rate. When the concentration of styrenesulfonate is less than or equal to 35 mass %, generation of homopolymer of styrenesulfonate is inhibited.

The duration of keeping the solution containing styrenesulfonate in contact with the resin film base material, on which the radical active site has been formed, is in the range of 30 minutes to 48 hours.

It is preferable that the contact between the solution containing styrenesulfonate and the resin film base material on which the radical active site has been formed is also processed in an inert gas atmosphere, such as nitrogen gas, neon gas, and argon gas, like the irradiation of ionizing radiation.

After the polymerization process, the ion exchange membrane is washed with water in a washing process. It is possible to use acid for the washing process as needed.

<Performance of Redox Flow Battery>

The pH of the electrolyte used for the redox flow battery is within the range of 2 to 8. Such an electrolyte hardly deteriorates the ion exchange membrane having the resin film base material the matrix of which is ethylene-vinyl alcohol copolymer.

Since the ion exchange membrane is obtained by graft-polymerizing styrenesulfonate to the resin film base material the matrix of which is ethylene-vinyl alcohol copolymer, the redox flow battery exhibits high performance.

The performance of the redox flow battery is indicated by energy efficiency. The energy efficiency is calculated based on coulombic efficiency and voltage efficiency.

The coulombic efficiency is calculated by assigning the following to the formula (2) below: a coulomb (A) during the charging in the $2^{nd}$ cycle, and a coulomb (B) during the discharging in the $2^{nd}$ cycle, wherein a single charge plus a single discharge are regarded as a cycle.

$$\text{Coulombic efficiency}[\%] = B/A \times 100 \quad (2)$$

The coulombic efficiency is preferably greater than or equal to 80%.

The voltage efficiency is calculated by assigning the following to the formula (3) below: an average terminal voltage (V1) during the charging in the $2^{nd}$ cycle, and an average terminal voltage (V2) during the discharging in the $2^{nd}$ cycle, wherein a single charge plus a single discharge are regarded as a cycle.

$$\text{Voltage efficiency}[\%] = V2/V1 \times 100 \quad (3)$$

The voltage efficiency is preferably greater than or equal to 75%.

The energy efficiency is calculated by assigning the coulombic efficiency and the voltage efficiency to the formula (4) below.

$$\text{Energy efficiency}[\%] = \text{coulombic efficiency} \times \text{voltage efficiency}/100 \quad (4)$$

The energy efficiency is preferably greater than or equal to 60%.

The embodiment described above exhibits the following effects.

(1) The pH of the positive electrode electrolyte 22 and the negative electrode electrolyte 32 in the redox flow battery of this embodiment is within the range of 2 to 8. This redox flow battery has an ion exchange membrane, formed by graft-polymerizing styrenesulfonate to the resin film base material the matrix of which is ethylene-vinyl alcohol copolymer, as the diaphragm 21. The resin film base material in this embodiment costs less and is possible to exhibit high efficiency compared to, for example, an ion exchange membrane using a resin film base material the matrix of which is fluororesin. Accordingly, when an electrolyte with the pH within the range of 2 to 8 is used, the redox flow battery having the diaphragm 12 suitable for exhibiting high efficiency of the battery is obtained, while the production cost of the energy storage battery is reduced.

(2) It is easier to improve the energy efficiency by setting the thickness of the resin film base material in the range of 50 μm to 100 μm.

(3) It is easier to improve the energy efficiency by setting the graft rate of the ion exchange membrane to be greater than 10% and less than 120%.

(4) The resin film base material, the matrix of which is ethylene-vinyl alcohol copolymer, has hydrophilicity based on hydroxyl groups of vinyl alcohol. Therefore, the ion exchange membrane is obtained by polymerization reaction in a water system using a solution obtained by dissolving styrenesulfonate in water. Thus, the safety of production of the ion exchange membrane can be improved.

(Modification Examples)

The embodiment described above may be modified as follows.

The shape, configuration, or number of the charge/discharge cell 11 and the capacity of the positive electrode electrolyte tank 23 and the negative electrode electrolyte tank 33 of the redox flow battery may be modified according to the required performance, etc. The supply quantity of the positive electrode electrolyte 22 and the negative electrode electrolyte 32 to the charge/discharge cell 11 may also be set according to the capacity of the charge/discharge cell 11, for example.

The energy storage battery may not be a redox flow battery. In other words, the ion exchange membrane described above is applicable to any energy storage battery using the electrolyte with the above-mentioned pH range.

EXAMPLES

The present invention is further described in details with Examples and Comparative Examples below.

Example 1

Preparation of Ion Exchange Membrane (Diaphragm)

A resin film base material, which is an ethylene-vinyl alcohol copolymer film (Product name: EVAL EFF-F; Thickness: 50 μm; Ethylene content: 32 mol %; by Kuraray Co., Ltd.) cut into 80×80 mm, was sealed inside a plastic bag wherein the air inside the plastic bag has been replaced by nitrogen. After irradiating the resin film base material with an electron beam in a condition of acceleration voltage at 750 kV and absorbed dose at 50 kGy, 20 ml of a styrene-sulfonate solution with 10 mass % was injected into the plastic bag. Then, by graft-polymerizing styrenesulfonate to the resin film base material through shaking the plastic bag for two hours inside a thermostatic tank set to 50° C., an ion exchange membrane (diaphragm) was obtained.

The ion exchange membrane was taken from the plastic bag and dried after being washed with water, etc. The graft rate was calculated by assigning the previously measured mass of the resin film base material ($W_0$) and the mass of the ion exchange membrane ($W_1$) to the abovementioned formula (1).

<Preparation of Electrolyte>

An aqueous solution was prepared by the following method to comprise a one-liquid type electrolyte (also called as premix-type electrolyte) to be used as the positive electrode electrolyte and the negative electrode electrolyte. 0.08 mol (40 g) of $CrK(SO_4)_2 \cdot 12H_2O$ was dissolved in 40 mL of distilled water. Next, 0.09 mol (26.3 g) of EDTA4H and 0.18 mol (7.2 g) of NaOH were added little by little and dissolved in the aqueous solution. The aqueous solution was heated and refluxed for four hours. During the reflux, 32 ml of a NaOH aqueous solution having a concentration of 5.0 mol/L was added little by little. Then, after cooling the aqueous solution, 0.2 mol (16.4 g) of anhydrous sodium acetate was dissolved.

Next, after adding distilled water to make the total amount become 140 mL, dilute sulfuric acid having a concentration of 2.5 mol/L was added to adjust the pH to 5.7. In this way, a Cr-EDTA aqueous solution having a concentration of Cr-EDTA of 0.57 mol/L was prepared.

Next, 0.08 mol (13.5 g) of $MnSO_4 \cdot H_2O$ was dissolved in 140 mL of the prepared Cr-EDTA aqueous solution. Then, 0.08 mol (33.3 g) of $EDTA4Na \cdot 2H_2O$ was dissolved in the aqueous solution. After that, distilled water was added to make the total amount become 200 mL.

In this way, a one-liquid type electrolyte of Cr-EDTA complex (0.4 mol/L) and Mn-EDTA complex (0.4 mol/L) was obtained.

<Charge/Discharge Test>

The ion exchange membrane was installed to the above-mentioned redox flow battery to serve as the diaphragm and the charge/discharge test was conducted using the electrolyte.

Carbon felts (Product name: GFA5; by SGL Group) were used as the positive electrode and the negative electrode, and the area of the electrodes was set to be 10 $cm^2$. Glassy carbon plates (Product name: SG Carbon; thickness: 0.6 mm; by Showa Denko K.K.) were used as the collector plates.

Glass containers having the capacity of 10 mL were used as the positive electrode electrolyte tank and the negative electrode electrolyte tank. Silicone tubes were used as the supply tube, the collection tube, the inert gas supply tube and the exhaust tube. Micro tube pumps (MP-1000; by Tokyo Rikakikai Co., Ltd.) were used as the pumps. A charge/discharge battery test system (PFX200; by Kikusui Electronics) was used as the charge/discharge apparatus.

The conditions of the charge/discharge test were as follows: starting from charging; performing both charging and discharging at a constant current of 100 mA; and setting the charging cut-off voltage to 2.2 V and the discharging cut-off voltage to 0.8 V. Then, charging and discharging were repeated 3 times (3 cycles). Before and during the charge/discharge test, nitrogen gas was supplied through the inert gas supply tube.

During the charge/discharge test, the coulombic efficiency, the voltage efficiency, and energy efficiency in the $2^{nd}$ cycle of charge/discharge were calculated. The results are shown in the "Results of Charge/Discharge Test" column of Table 1.

Examples 2-5

Except for replacing the ion exchange membrane (diaphragm) with others having different graft rates as shown in Table 1, the charge/discharge tests for Examples 2-5 were conducted in the same way as Example 1. The results are shown in Table 1.

Examples 6-10

Except for replacing the ion exchange membrane (diaphragm) with others having different thickness and graft rates as shown in Table 1, the charge/discharge tests for Examples 6-10 were conducted in the same way as Example 1. The results are shown in Table 1.

TABLE 1

| | Ion Exchange Membrane (Diaphragm) | | Result of Charge/Discharge Test | | |
|---|---|---|---|---|---|
| | Thickness of Resin Film Base Material (μm) | Graft Rate [%] | Coulombic Efficiency [%] | Voltage Efficiency [%] | Energy Efficiency [%] |
| Example 1 | 20 | 16 | 74 | 78 | 58 |
| Example 2 | 20 | 17 | 78 | 79 | 62 |
| Example 3 | 20 | 22 | 78 | 78 | 62 |
| Example 4 | 20 | 57 | 73 | 75 | 55 |
| Example 5 | 20 | 100 | 67 | 73 | 49 |
| Example 6 | 50 | 71 | 87 | 80 | 70 |
| Example 7 | 100 | 29 | 93 | 80 | 74 |
| Example 8 | 100 | 63 | 90 | 82 | 73 |
| Example 9 | 150 | 20 | 85 | 66 | 56 |
| Example 10 | 150 | 62 | 76 | 74 | 56 |

Figure 2:
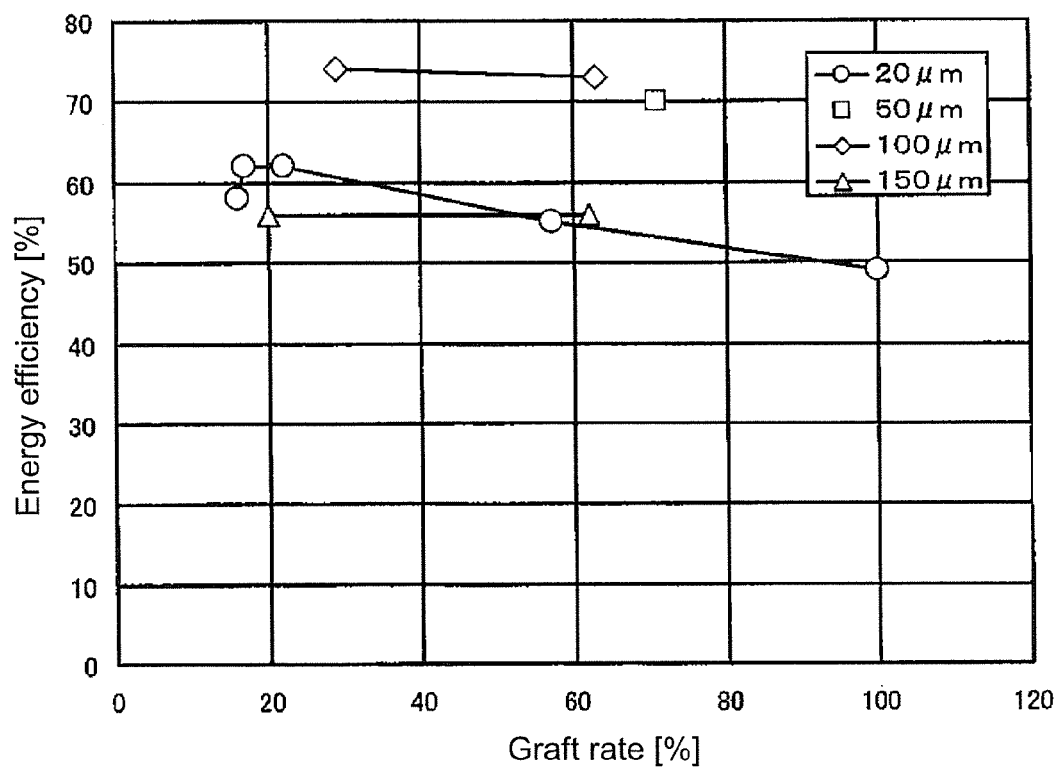
FIG. 2 is a graph showing the relationship between the graft rate of the ion exchange membrane and the energy efficiency of the redox flow battery of Examples.
Figure 3:
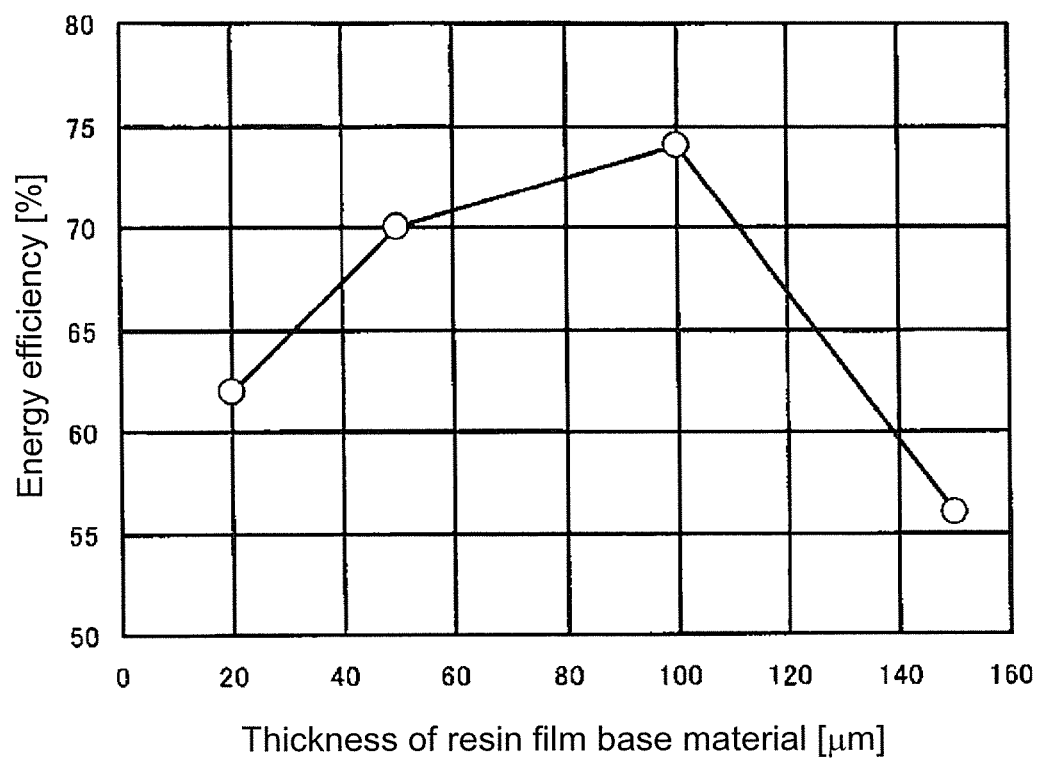
FIG. 3 is a graph showing the relationship between the thickness of the resin film base material and the energy efficiency of the redox flow battery of Examples.

The relationship between the graft rate and the energy efficiency is shown in FIG. 2. The relationship between the thickness of the resin film base material and the highest energy efficiency obtained by the thickness is shown in FIG. 3.

Comparative Example 1

A polyethylene film was used as the resin film base material for trying to graft-polymerize styrenesulfonate to the film, but the percentage of the graft rate remained single-digit. The ion exchange membrane obtained did not possess performance required for the diaphragm.

Comparative Example 2

A polypropylene film was used as the resin film base material for trying to graft-polymerize styrenesulfonate to the film, but the percentage of the graft rate remained single-digit. The ion exchange membrane obtained did not possess performance required for the diaphragm.

Comparative Example 3

A polyamide film was used as the resin film base material for trying to graft-polymerize styrenesulfonate to the film, but the percentage of the graft rate remained single-digit. The ion exchange membrane obtained did not possess performance required for the diaphragm.

What is claimed is:

1. An energy storage battery, wherein a positive electrode electrolyte and a negative electrode electrolyte having a pH value within a range of 2 to 8 are used, characterized in comprising:
    an ion exchange membrane, formed by graft-polymerizing styrenesulfonate to a resin film base material a matrix of which is ethylene-vinyl alcohol copolymer, as a diaphragm of the positive electrode electrolyte and the positive electrode electrolyte.

2. The energy storage battery of claim 1, wherein a thickness of the resin film base material is greater than or equal to 50 μm and less than or equal to 100 μm.

3. The energy storage battery of claim 1, wherein a graft rate of the ion exchange membrane is greater than 10% and less than 120%.

4. The energy storage battery of claim 2, wherein a graft rate of the ion exchange membrane is greater than 10% and less than 120%.

* * * * *